United States Patent [19]
Cochrane et al.

[11] Patent Number: 5,963,936
[45] Date of Patent: Oct. 5, 1999

[54] QUERY PROCESSING SYSTEM THAT COMPUTES GROUPING SETS, ROLLUP, AND CUBE WITH A REDUCED NUMBER OF GROUP BYS IN A QUERY GRAPH MODEL

[75] Inventors: Roberta Jo Cochrane, Los Gatos; Michelle Meichiou Jou, San Jose; George Lapis, San Jose; Mir Hamid Pirahesh, San Jose, all of Calif.

[73] Assignee: International Business Machines Corporation, Armonk, N.Y.

[21] Appl. No.: 08/885,485

[22] Filed: Jun. 30, 1997

[51] Int. Cl.[6] ..................................................... G06F 17/30
[52] U.S. Cl. ............................................. 707/3; 707/2; 707/5
[58] Field of Search .................................... 707/5, 2, 3

[56] References Cited

U.S. PATENT DOCUMENTS

| | | | |
|---|---|---|---|
| 5,511,190 | 4/1996 | Sharma et al. ............................... | 707/2 |
| 5,537,589 | 7/1996 | Dalal ............................................. | 707/2 |
| 5,546,576 | 8/1996 | Cochrane et al. ........................ | 395/600 |
| 5,590,324 | 12/1996 | Leung et al. .............................. | 395/605 |
| 5,598,559 | 1/1997 | Chaudhuri .................................... | 707/2 |
| 5,713,020 | 1/1998 | Reiter et al. ................................ | 7/102 |
| 5,724,570 | 3/1998 | Zeller et al. ................................ | 707/3 |
| 5,761,653 | 6/1998 | Schiefer et al. ............................ | 707/2 |
| 5,781,896 | 7/1998 | Dalal ........................................... | 707/2 |
| 5,794,229 | 8/1998 | French et al. ............................... | 707/2 |

Primary Examiner—Anton Fetting
Assistant Examiner—Jean M. Corrielus
Attorney, Agent, or Firm—Gray Cary Ware Freidenrich

[57] ABSTRACT

Method and apparatus for detecting and stacking grouping sets to support GROUP BY operations with GROUPING SETS, ROLLUP and CUBE extensions in relational database management systems, with greatly reduced numbers of grouping sets. A first GROUP BY (element-list1) is input to a second GROUP BY (element-list2), resulting in the GROUP BY of the intersection of the two lists. This intersection property is then useable to reduce the number of GROUP BYs required to implement the grouping by GROUPING SETS, ROLLUPs, and CUBEs required for the online analytical processing of data contained in the database.

14 Claims, 6 Drawing Sheets

FIG. 1

| MONTH | REGION | SALES_MGR | SUM(SALES) |
|---|---|---|---|
| April | Central | ALL | 40 000 |
| April | Northwest | ALL | 15 000 |
| April | ALL | Chow | 25 000 |
| April | ALL | Smith | 30 000 |
| May | Central | ALL | 25 000 |
| May | Northwest | ALL | 15 000 |
| May | ALL | Chow | 25 000 |
| May | ALL | Smith | 15 000 |

FIG. 2

| MONTH | REGION | SALES_MGR | SUM(SALES) |
|---|---|---|---|
| April | Central | Chow | 25 000 |
| April | Central | Smith | 15 000 |
| April | Central | ALL | 40 000 |
| April | Northwest | Smith | 15 000 |
| April | Northwest | ALL | 15 000 |
| April | ALL | ALL | 55 000 |
| May | Central | Chow | 25 000 |
| May | Central | ALL | 25 000 |
| May | Northwest | Smith | 15 000 |
| May | Northwest | ALL | 15 000 |
| May | ALL | ALL | 40 000 |
| ALL | ALL | ALL | 95 000 |

FIG. 3

| MONTH | REGION | SALES_MGR | SUM(SALES) |
|---|---|---|---|
| April | Central | Chow | 25 000 |
| April | Central | Smith | 15 000 |
| April | Central | ALL | 40 000 |
| April | Northwest | Smith | 15 000 |
| April | Northwest | ALL | 15 000 |
| April | ALL | Chow | 25 000 |
| April | ALL | Smith | 30 000 |
| April | ALL | ALL | 55 000 |
| May | Central | Chow | 25 000 |
| May | Central | ALL | 25 000 |
| May | Northwest | Smith | 15 000 |
| May | Northwest | ALL | 15 000 |
| May | ALL | Chow | 25 000 |
| May | ALL | Smith | 15 000 |
| May | ALL | ALL | 40 000 |
| ALL | Central | Chow | 50 000 |
| ALL | Central | Smith | 15 000 |
| ALL | Central | ALL | 65 000 |
| ALL | Northwest | Smith | 30 000 |
| ALL | Northwest | ALL | 30 000 |
| ALL | ALL | Chow | 50 000 |
| ALL | ALL | Smith | 45 000 |
| ALL | ALL | ALL | 95 000 |

QUERY PROCESSING SYSTEM THAT COMPUTES GROUPING SETS, ROLLUP, AND CUBE WITH A REDUCED NUMBER OF GROUP BYS IN A QUERY GRAPH MODEL

BACKGROUND OF THE INVENTION

1. Field of the Invention

This invention relates generally to query processing in relational database management systems. More particularly, the present invention relates to processing aggregation queries by stacking GROUP BY expressions to produce a query graph model of an SQL query that includes either multiple grouping sets, concatenations of ROLLUPs, or CUBE. The number of GROUP BY expressions in the query graph model is reduced by taking advantage of a previously unknown intersection property of GROUP BY operations.

2. Description of the Related Art

A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data storage devices. A "table" includes a set of rows (formally denominated "tuples" or "records") spanning several columns (denominated "attributes"). Reference is made to C. J. Date, *An Introduction to Database Systems*, 6th edition, Addison-Wesley Publishing Co. Reading, Mass. (1994) for an comprehensive general treatment of the relational database art.

An RDBMS is structured to accept commands to store, retrieve and delete data using high-level query languages such as the Structured Query Language (SQL). The term "query" denominates a set of commands for retrieving data from a stored database. The SQL standard has been promulgated by the International Standards Association since 1986. Reference is made to the SQL-92 standard "Database Language SQL" published by the ANSI as ANSI X3.135-1992 and published by the ISO as ISO/IEC 9075:1992 for the official specification of the 1992 version of the Structured Query Language. Reference is also made to James R. Groff et al. (*LAN Times Guide to SQL*, Osborne McGraw-Hill, Berkeley, Calif., 1994) for a lucid treatment of SQL-92, and to Don Chamberlin, Using the New DB2, Morgan Kaufman Publishers, Inc., 1996, for a discussion of that language.

Aggregate functions have been developed and implemented for SQL that produce a single value (for example, SUM) from a group of values in the SELECT (or HAVING) clause of an SQL query. The GROUP BY operator groups aggregate values into zero (single-row) or single-dimensioned (multi-row) aggregates. The GROUPING SET operator extends the GROUP BY operation to simultaneously specify the computation of multiple GROUP BYs in a single GROUP BY operation. When the GROUPING SET operator is used, the ALL value in a column denotes that the particular column is collapsed in the aggregation. The ROLLUP and CUBE operators are shorthand for GROUPING SET that represent common sets of GROUP BY operations that are required for common queries for on-line analytical processing (OLAP). Concatenation of ROLLUPs in a GROUP BY operation is shorthand for multi-dimensional analysis, common in OLAP applications.

A common use for an RDBMS is online transaction processing (OLTP). OLTP is characterized by many users creating, updating and retrieving individual database records. OLTP queries tend to be based on the retrieval of individual records.

In contrast to OLTP, the online analytical processing (OLAP) of databases is characterized by a few users running large and often complex aggregation queries, for instance to compute complex analyses over several axes of an entire database. The OLAP Grouping extensions were added to DB2 V5, inter alia to enhance that language's query aggregation power and to permit the specification of common OLAP computations in the database. These computations include the CUBE extension of GROUP BY, concatenations of ROLL-UP, and multiple grouping sets, all of which require multiple GROUP BY operations. These OLAP grouping extensions will be incorporated in the forthcoming ANSI SQL-3 standard, and reference is made to several papers accepted by ANSI and/or ISO for inclusion in the SQL-3 standard including: "Super Sets (The Cube and Beyond)", Frank Pellow, ANSI Z3H2-96-205(R3)/MAD-032(R1); "Super Sets—Concatenation and Grouping Sets:", Frank Pellow, ANSI X3H2-096-585; and the ISO-ANSI Working Draft, Database Language SQL-Part 2: Foundation (SQL/Foundation, Apr. 13, 1997. DBL:LGW-008 and X3H2-97-030. Further, reference in made to the SQL-92 standard "Database Language SQL" published by the ANSI as ANSI X3.135-1992 and published by the ISO as ISO/IEC 9075: 1992 for the official specification of the 1992 version of the Structured Query Language. Each of these authorities is herewith incorporated by reference.

The OLAP grouping extensions to DB2, incorporating the previously discussed references, implementing at least the ability to group by CUBE, ROLLUP, and multiple grouping sets, are referred to hereinafter as "OLAP grouping extensions". These functions are generalized by the following syntax:

```
<group by clause>::=
   GROUP BY    <grouping_expr>,... //a list
<grouping_expr>::=
   <grouping_element>
   |
   (<grouping_element>,...)
   |()
<grouping_element>::=
   <scalar_element>
   | ROLLUP (<grouping-element>,...)
   | CUBE (<grouping-element>,...)
   | GROUPING SETS (<grouping-element>,...)
```

GROUPING SETS are used in conjunction with aggregation functions (MAX, MIN, SUM, AVG, COUNT, etc.) to enable multiple "groupings" in a single computational pass and are further restrictable by the HAVING clause.

Consider now, a massive database represented by a table T (entitled "SALES") where the automobile sales of an organization are entered on a daily basis, with attributes of day, week, month, year, salesperson, manager, city, region, and units sold. The following query, implementing GROUPING SETS, returns the total sales of the organization during each month of 1996, per sales region and per sales manager:

SELECTMONTH(SALES_DATE), REGION, SALES_MGR, SUM(SALES)
FROM SALES
WHERE YEAR(SALES_DATE)=1996
GROUP BY GROUPING SETS
 ((MONTH(SALES_DATE),REGION),
 (MONTH(SALES_DATE),SALES_MGR))

Results for April and May are shown in FIG. 1.

The use of ROLLUPs extends grouping semantics to produce "sub-total" rows, thereby producing "regular"

grouped rows. Moreover, the same groupings are re-applied down to the grand total. For example, the following query, implementing ROLLUP, returns the total sales of the organization during each month of 1996, per sales region, per sales manager pair and per sales region, with subtotals for each month, and concluding with the grand total:

SELECT MONTH(SALES_DATE), REGION,
      SALES_MGR, SUM(SALES)
      FROM SALES
      WHERE YEAR(SALES_DATE)=1996
      GROUP BY ROLLUP (MONTH(SALES_DATE),
         REGION, SALES_MGR)

Results for April and May are shown in FIG. 2.

Finally, the use of the CUBE operator further extends grouping semantics to produce multi-dimensional grouping and "sub-total" rows. Accordingly, it will be appreciated that a CUBE operator produces results that are a superset of a ROLLUP operator with the same arguments. Furthermore, CUBE is equivalent to a concatenation of ROLLUPs of each argument of the CUBE. That is, CUBE of (a, b, c, . . . ) is equivalent to ROLLUP(a) ROLLUP(b) ROLLUP(c) . . . . The CUBE operator produces "regular" grouped rows, and the same groupings are re-applied down to a grand total. Finally, it produces additional groupings on all variants of the CUBE clause.

By way of example, the following query, implementing CUBE, returns the total sales of the organization during each month of 1996, with subtotals and overall totals for each month, each region, and each sales manager, and concluding with the grand total of sales for the year 1996.

SELECT MONTH1(SALES_DATE), REGION,
      SALES_MGR, SUM(SALES)
      FROM SALES
      WHERE YEAR(SALES_DATE)=1996
      GROUP BY CUBE (MONTH(SALES_DATE),
         REGION, SALES_MGR)

Results for April and May are shown in FIG. 3.

From each of the foregoing examples, it becomes apparent that the specification of the GROUP BY clause used in OLAP often expands into many GROUPING SETS. For example, the CUBE alone will result in $2^n$ GROUPING SETS. Any concatenation of p ROLLUPs results in ((n1+1)×(n2+1)×. . . (np+1)) GROUPING SETS, where ni is the number of elements of the i-th ROLLUP. The addition of one to each ni represents the inclusion of the grand total row in which ALL appears in every field. Each GROUPING SET requires the execution of a GROUP BY operation, in the prior art.

For example:
   GROUP BY ROLLUP (a1,a2,a3,a4), ROLLUP(b1,b2,b3,
      b4), ROLLUP (c1,c2,c3,c4),
      ROLLUP(d1,d2,d3,d4)

shows a four dimensional OLAP model, with dimensions a,b,c,d, each having a four level hierarchy. This query expands to 5×5×5×5=625 GROUPING SETS, which requires 625 GROUP BYs to be performed on the data.

Further,
   GROUP BY CUBE(a1,a2,a3,a4,b1,b2,b3,b4,c1,c2,c3,c4,
      d1,d2,d3,d4)

expands to 2\*\*16=32,768 GROUP BYs to be formed on the data.

From the foregoing, it becomes obvious that the OLAP extension to DB2 may require significant computational assets to implement. This requirement of course increases with the number of users, with the size of the database, as well as with the complexity and size of the aggregation queries submitted for computation. In order to provide the advantages of OLAP technology to database users at acceptable levels of computer overhead, efforts have been undertaken by a number of workers to make OLAP implementation more efficient.

In general, these efforts have focused on ways to reduce the number of data scans to compute the group bys. One such effort was reported in "Data Cube: A Relational Aggregation Operator Generalizing GROUP BY, Cross-Tab, and Sub-Totals", a Microsoft Technical Report by Gray et al. An extended abstract of this document was published under the same name in ICDE 1996, pg. 152–159, 12th International Conference on Data Engineering, Feb. 26–Mar. 1, 1996, New Orleans, ISBM 0-8186-7240-4, WEEE Computer Society.

According to Gray et al., the aggregate functions enabled by the OLAP extensions (termed in that work "super-aggregates") can be classified into three categories: Distributive, Algebraic and Holistic. Gray et. al teach ". . . no more efficient way of computing super-aggregates of holistic functions than the $2_N$ algorithm using the standard GROUP BY techniques." The reference declines to comment on cubes of holistic functions.

Regarding cubes of distributive functions, Gray et. al. maintain that they are " . . . relative easy to compute . . . . Thinking in terms of the cross tab, one has a choice of computing the result by aggregating the lower row, or aggregating the right column (aggregate (ALL,\*) or (\*, ALL)). Either approach will give the same answer. The algorithm will be most efficient if it aggregates the smaller of the two (pick the \* with the smallest $C_i$). In this way, the super-aggregates can be computed dropping one dimension at a time."

With respect to algebraic aggregation, Gray et. al. go on to state that:

"Algebraic aggregates are more difficult to compute than distributive aggregates . . . An algebraic aggregate must maintain (M-tuple) for each element of the cube . . . When the core GROUP BY operation completes, the CUBE algorithm passes the set of handles to each N-1 dimensional super-aggregate. When this is done the handles of the super-aggregates are passed to the super-super-aggregates, and so on until the (ALL, ALL, . . . ,ALL) aggregate has been computed."

While these efforts have met with some success in limited implementations having relatively small databases accessed and queried by a small number of users, the full implementation of GROUPING SETS, ROLLUP and CUBE with multidimensional hierarchy support in large multi-user systems receiving complex queries (such as the DB2 Universal Database system available from International Business Machines Corporation) has generally not been effected prior to the present invention. This is due to the computational overhead required by the query strategies previously propounded for these aggregation functions, and to the novelty of these operations in the context of SQL.

This computational overhead is occasioned by the fact that the work of others has heretofore focused on ways to reduce the number of data scans to compute the GROUP BYs. Since this methodology has, as previously discussed, failed to enable full implementation of the OLAP GROUP BY clauses, it becomes obvious that some further means must be found to reduce the computational cost, or overhead, of the calculations necessary to support this technology.

SUMMARY OF THE INVENTION

In the quest to reduce computational overhead thereby enabling the implementation of the OLAP extensions, the strategy of minimizing the number of computational passes has been only partially successful. For the purposes of building any query plan which efficiently implements CUBE, ROLLUP and GROUPING SETS, what is even more important is to also reduce the number of GROUP BY computations which the plan requires, thereby reducing the computational complexity of the query.

The reduction of GROUP BY computations in a query plan is enabled by the novel discovery that, if a first GROUP BY (element-list1) is input to a second GROUP BY (element-list2), where the aggregates being computed for the group by elements are not holistic, then the result is the GROUP BY of the intersection of the two lists. When used herein, "non-holistic" functions include those functions characterized by Gray, et al as distributive (such as SUM) and algebraic (such as AVERAGE). For the purposes of exposition, two parameters of a GROUP BY operation are considered: the input stream of the group by, and the grouping elements of the group by. For example, SELECT a, b, SUM(c)

FROM T

GROUP BY a, b

Will be represented as GROUP BY(T, <a,b>), where the input stream of tuples to the GROUP BY is from the table T. This is shown in FIG. 4, where a table T includes tuples with attributes that include a, b and c, and the GROUP BY operation draws on these tuples and the aggregate function SUM(c) to produce a result table R.

To restate our novel observation, where the original GROUP BY is on an input stream of table T:

GROUP BY(GROUP BY(T, element-list1), element-list2)==GROUP BY(T, element-list1 intersect element-list2).

For example, with reference to the table of FIG. 1 and to the expression that created it, if a third grouping set (MONTH(SALES_DATE)) were included in the argument of the GROUP BY, then there is no need to add any GROUP BY operation to the computation. Instead, the results of one of the grouping sets (say (MONTH(SALES_DATE), REGION) are taken and fed through the other group by operation that is already in the graph. In this case the GROUP BY (MONTH(SALES_DATE), SALES_MGR) produces:

GROUPINGSETS ((MONTH(SALES_DATE), SALES_MGR), (MONTH(SALES_DATE)))

i.e. it produces GROUP BY MONTH (SALES_DATE), SALES_MGR UNION GROUP BY MONTH(SALES_DATE). In this case, the result would produce the table of FIG. 1, with the following two additional rows:

| April | ALL | ALL | 55 000 |
|-------|-----|-----|--------|
| May   | ALL | ALL | 40 000 |

Using this property, a reduced number of GROUP BYs can be stacked in a query graph model to yield a result that would, in the prior art, be produced by more GROUP BYs. This enables a reduction in the complexity of computation of large aggregation queries. It should be noted that the prior art has always focused on the optimization of computing the group by of an element-list from a prior computation of a group by for a super-set of element-list as shown in the example. The present invention enables, for the first time, an actual reduction in the computational complexity of a query plan that includes multiple group by operations resulting from multiple grouping sets, concatenated rollups, or the cube operation. For example, the invention reduces the GROUP BYs performed for the CUBE example set forth in the Background with 16 elements from 32,768 to 17.

This property can be implemented in a number of novel ways to reduce the GROUP BY operations of several types of aggregation queries, including those of the OLAP grouping extensions previously discussed. A first, direct application of this mechanism is utilized for taking advantage of the intersection property in the computation of a general list of GROUPING SETS. While useful in and of itself, this application employs a computationially expensive expansion step.

Given concatenated ROLLUPs, an optimal set of groupings can be derived from the concatenated ROLLUPs, thereby avoiding the expensive expansion step.

Finally, the present invention demonstrates that, by application of the principles taught herein, the CUBE function is equivalent to a concatenation of ROLLUPs. Hence, the ROLLUP stacking algorithm can be applied to the CUBE problem.

BRIEF DESCRIPTION OF THE DRAWING

For a more complete understanding of this invention, reference is now made to the following detailed description of the embodiments as illustrated in the accompanying drawing, wherein:

FIG. 1 is a table showing the results of a GROUP BY operation that specifies multiple GROUPING SETS;

FIG. 2 is a table showing the results of a GROUP BY operation that specifies a ROLLUP;

FIG. 3 is a table showing the results of a GROUP BY operation that specifies a CUBE;

DESCRIPTION OF THE PREFERRED EMBODIMENTS

While the principles of the present invention are directed to a broad range of database query processing and execution schemas, the preferred embodiments presented hereinafter are, for purposes of expositional clarity, illustrated with respect to a generalized query optimizer implemented on a generalized computer. It will be obvious to those of skill in the art that the principles of this invention are not only applicable to a wide variety of computational problems, but are capable of implementation on a number of computer hardware and software systems. This description herein specifically contemplate all such alternatives.

The System of the Invention

Figure 5:
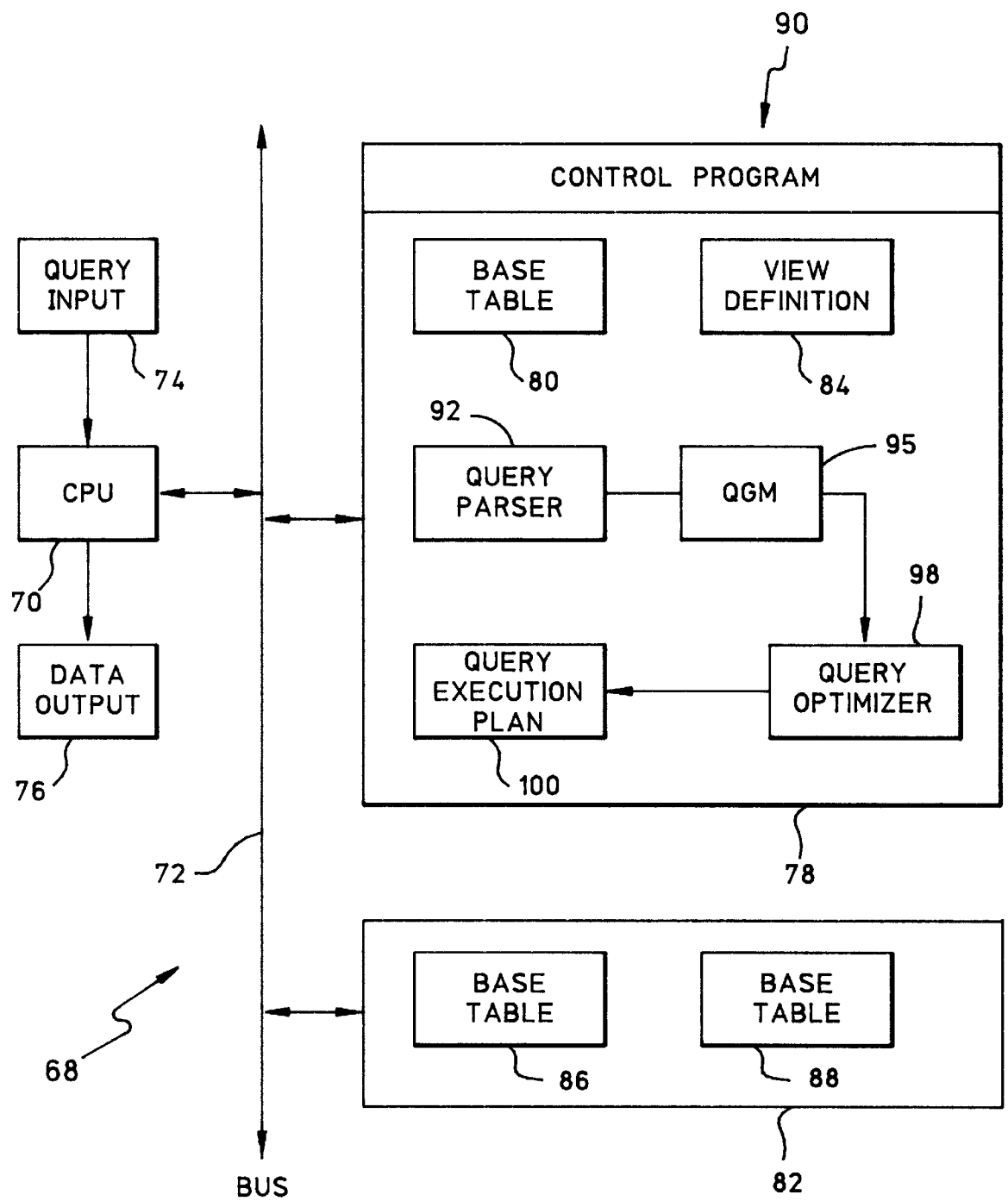
FIG. 5 is a functional block diagram of a computer-implemented database processing system suitable for practicing the present invention.

FIG. 5 shows a functional block diagram of a computer-implemented database processing system 68 suitable for practicing the invention. System 68 includes a central processing unit (CPU) 70, which is coupled to a parallel bus 72. The query input terminal 74 allows the user to enter queries into system 68, either from a remote terminal or through any other useful method known in the art. As used herein, a "user query" includes a combination of commands, including but not limited to SQL commands, intended to produce one or more output data tables according to the specification included in the query. The data output terminal 76 displays the query results to the user and may be physically co-located with query input terminal 74.

System 68 includes the address space 78, which is shown schematically as containing program objects and data objects. The base table 80 is an example of a data object pulled into address space 78 from the external mass store 82 by way of bus 72. The view definition 84 is another data object representing a "virtual table" made up of elements from one or more base tables in accordance with a VIEW definition statement. External mass store 82 often includes, as here, a generally large plurality of base tables, exemplified by base tables 86 and 88. These base tables are moved partially or entirely between memory space 78 and external mass store 82 in a manner well-known in the art for database management systems.

Address space 78 also includes the control program object 90, which manages the other components of system 68. These components include a query parser 92 for accepting the query input from terminal 74 and forwarding it to the query optimizer 98. Generally, the query parser 92 lexes, parses, and semantically checks a query, producing an internal representation (a "query graph model") that is rewritten and submitted to the optimizer which generates an optimized query execution plan. Therefore, address space 78 may further include additional program objects for manipulating the query, including objects (not shown) which rewrite the parsed query to provide a query graph model (QGM) 95 for output to the query optimizer 98.

After query optimizer 98 receives the QGM 95, a generally large number of useful plans for executing the query are generated and tested for "cost" in accordance with a predetermined cost formula. After identifying an "optimal" query execution plan, optimizer 98 produces this plan as a program object, depicted as query execution plan 100 in address space 78. Plan 100 is finally executed with the assistance of control program 90 and the resulting table is forwarded to data output of display 76 upon completion.

The system of FIG. 5 employs the invention to produce a QGM in which the number of GROUP BYs necessary to execute a GROUP BY with multiple GROUPING SETS, concatenated ROLLUPs, or a CUBE has been reduced.

The Basic Process of the Invention

In accordance with the description of this invention, a query is represented as a query graph model in which nodes $\{N_i\}$ each represent tables or table expressions. With the exception of base tables, each node $N_i$ is connected to at least one other node $N_j$ by a directed data-flow arc $A_{ji}$ representing the consumption by node $N_i$ of records (tuple streams) produced by node $N_j$ for use in the computation of records internally to node $N_i$. Thus, $A_{ij} \neq A_{ji}$ because $A_{ij}$ represents the flow of data from $N_i$ to $N_j$.

The nodes $\{N_i\}$ are labeled according to the relational operation contained therein. For example, a UNION node $N_{UNION}$ represents a UNION operation on the data that flows in from the incoming data-flow arcs, and a base table node T represents all the records in a base table T.

Figure 4:
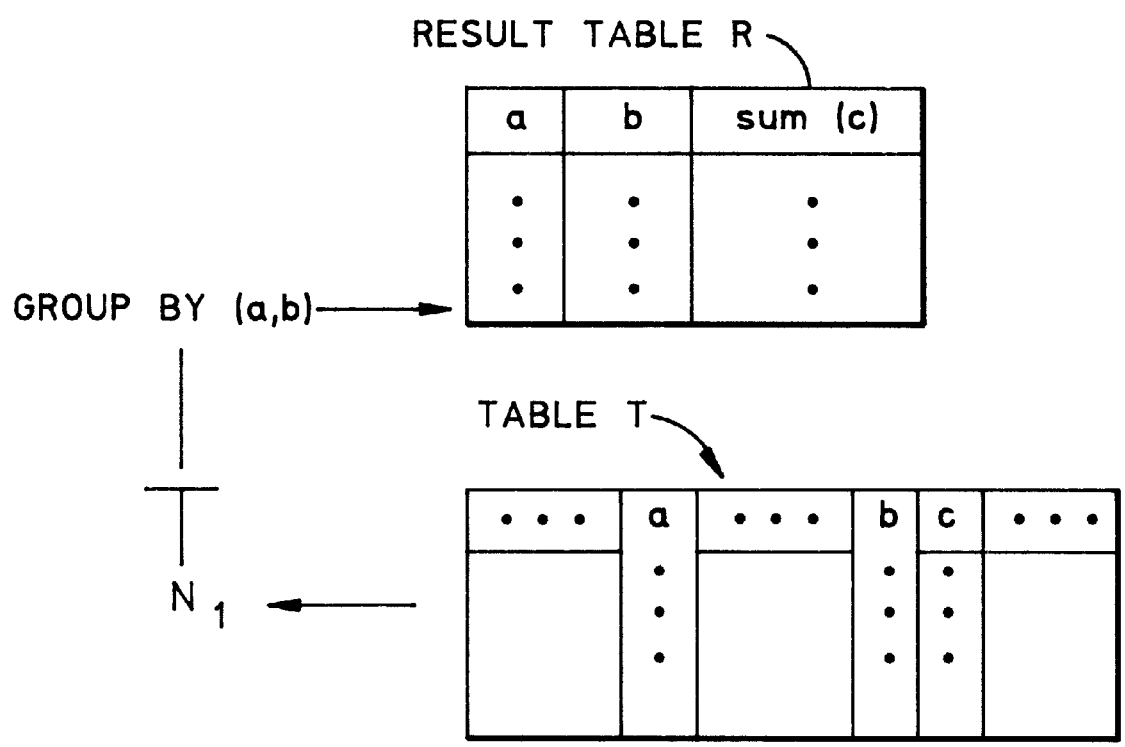
FIG. 4 is a graph showing the derivation of a table that contains results of a GROUP BY operation performed using tuples of a table T.

Thus, in FIG. 4, T is node $N_b$, representing the initial (massive) table from whose contents the table produced by GROUP BY (node $N_a$) is obtained. The arc $A_{ab}$ is the stream of tuples input from table T to the GROUP BY.

Operation of the Invention

The process of this invention is now described in detail in connection with the preferred embodiment illustrated in FIGS. 6 and 7. Consider the expression:

GROUP BY GROUPING SETS
((abxy), (abx), (ab), (axy), (ax), (a), (xy), (x), ( ))

where ( ) represents ALL for all columns.

Figure 6:
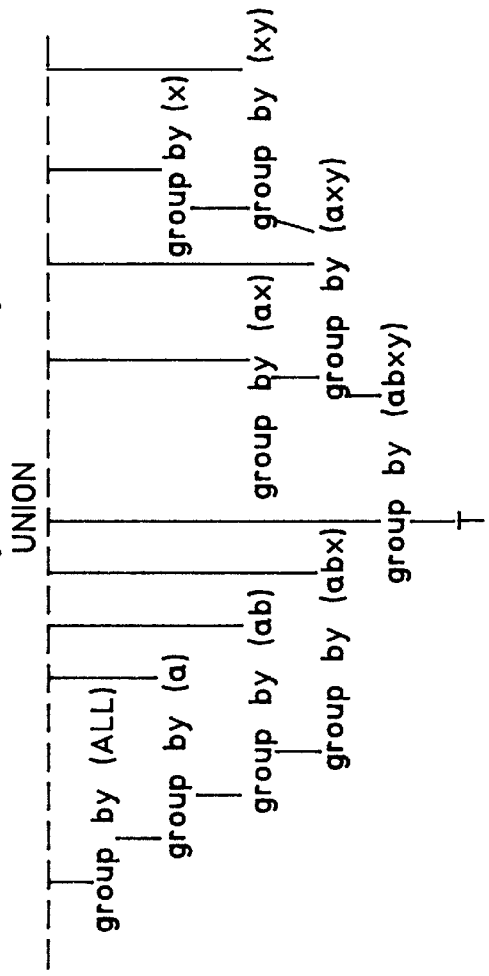
FIG. 6 is a query graph model produced according to the prior art for a GROUP BY expression with nine GROUPING SETS.
Figure 7:
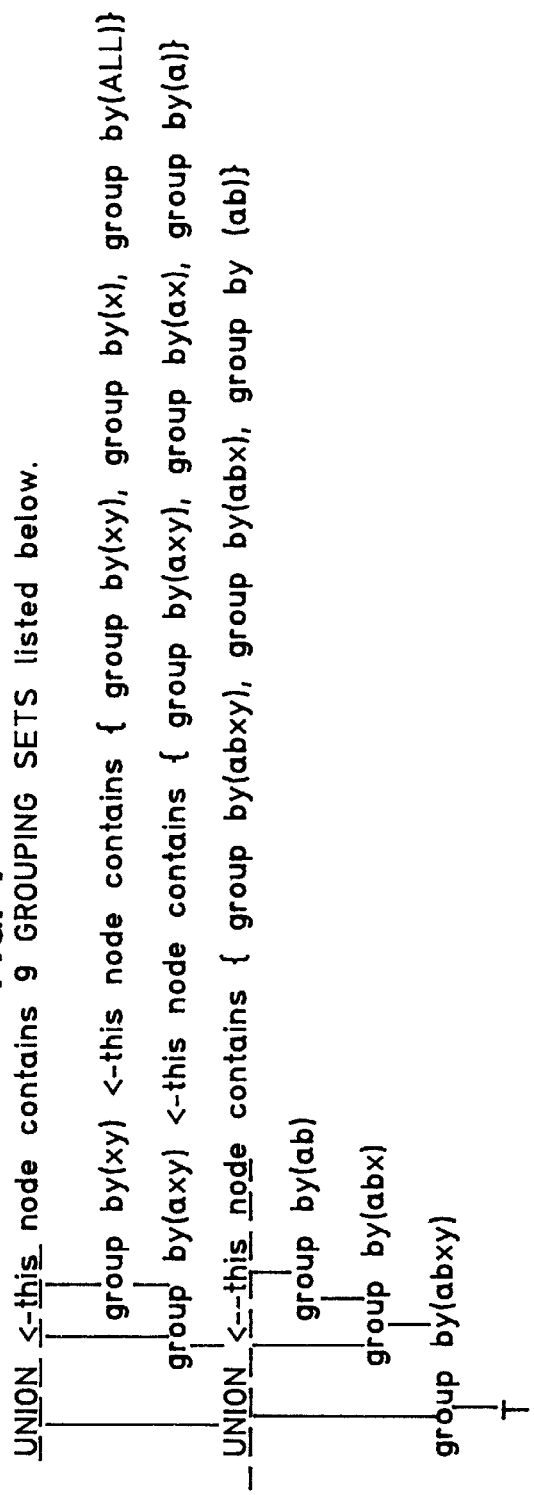
FIG. 7 is a query graph model produced according to the invention for the GROUP BY expression of FIG. 6.

According to the prior art as shown in FIG. 6, this operation would normally be computed by a total of 9 GROUP BYs, taking advantage where possible of computing a GROUP BY of subsets from the GROUP BY of some superset. One reasonable QGM for this might have been as shown in FIG. 6.

Having reference to FIG. 6, the following intersection results should be noted:

(1) group by(group by(T, abx), axy)==group by(T, ax)
(2) group by(group by(T, ab), axy)==group by(T, a)
(3) group by(group by(T, abx), xy)==group by(T, x)
(4) group by(group by(T, ab), xy)==group by(T, ALL)
(5) group by(group by(T, axy), abx)==group by(T, ax)
(6) group by(group by(T, xy), abx)==group by(T, x)
(7) group by(group by(T, axy), ab)==group by(T, a)
(8) group by(group by(T, xy), ab)==group by(T, ALL)

Now, utilizing the principles of the present invention, and noting the previously derived intersection results shown above at (1)–(4), it becomes possible to construct a query graph model that includes a stacking of GROUP BYs that results in the computation and planning of only 5 GROUP BYs as opposed to the 9 required in FIG. 6. This query graph model is shown in FIG. 7. It should be emphasized that the query graph model of FIG. 7 produces results that are identical to the solution provided in FIG. 6, with only 5 GROUP BY operations, a considerable economy in computational overhead. Indeed, this reduction in the number of GROUP BYs may, in an RDBMS implementing large multi-dimensional tables and subject to complex OLAP queries, be necessary to implement the query. This is due to the fact that the size of such queries, combined with the prior art, can require such large-scale computational assets as to render the query incapable of implementation.

A Direct Implementation of the Present Invention

Figure 8:
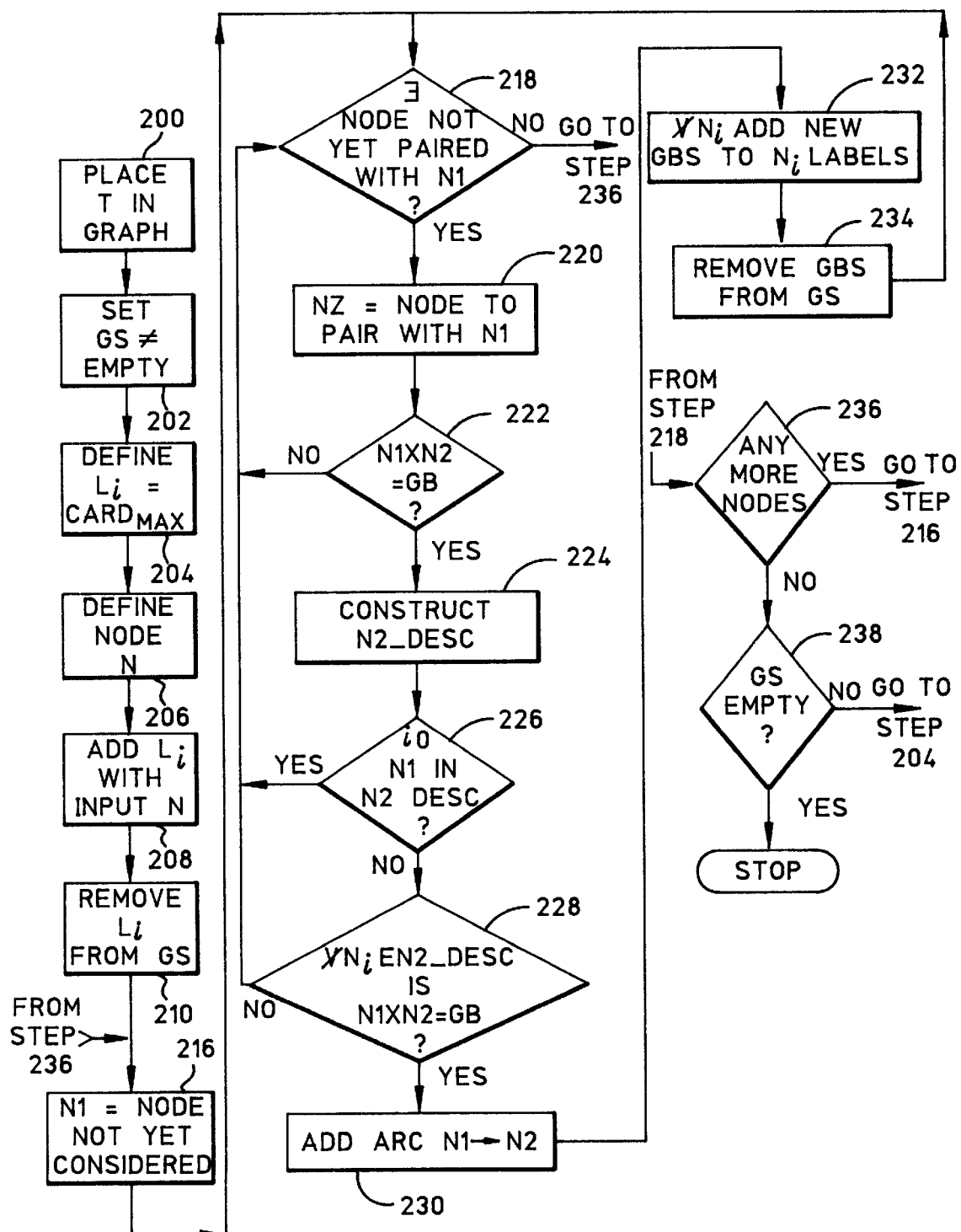
FIG. 8 is a data flow diagram for the GROUP BY stacking function of the present invention.

Having reference to FIG. 8, a straightforward implementation of the present invention, as discussed above and utilizing the novel intersection property taught herein, is used in the computation of a general list of GROUPING SETS.

Given a set of GROUPING-SETS GS=(G1, G2, . . . , Gn), the operation of a GROUPING SET is allowed to represent a GROUP BY that will be performed, and the label of the GROUPING-SET is allowed to represent the GROUP BYs that will result from the application of the GROUP BY operation to all its inputs. For example:

GROUP BY (GROUP BY(T, a) UNION T, x)

In this example, the operation of the outer GROUP BY is x. The label of the outer GROUP BY is {x, ( ) }. Each GROUPING SET's label is initialized with its operation.

This embodiment is shown in FIG. 8, and is explained as follows:

At step 200, base table T is placed in the graph, and GS is initialized with the entire set of GROUPING SETS that need to be computed. A variable indicating that GS is empty is set to False at step 202. A variable L1__1 is defined, at step 204, that represents a maximal GROUPING SET in GS. That is, the GROUPING SET represented by L1__1 is not a subset of any other GROUPING SET in GS. Note that L1__1 also represents a GROUP BY operation performed on the maximal set. At step 206, node N is found in the graph whose operation is a superset of the L1__1 and whose label intersect with the operation of $L1_{13}$ 1 does not produce any GROUPING SETs not in GS. In the worst case, node N is the base table node T. At step 208 L1__1 is added to the graph with N as its input, and with a label that includes any GROUPING SETS produced from the intersection of the label of N with the operation L1__1. At step 210, the GROUPING SETS of this newly computed label of L1__1 is removed from GS.

At step 216, N1 is assigned a node in the graph that has not previously been considered. At step 218, a decision is made if there exists a node different from N1 that has not been considered with N1. If so, continue to step 220. Otherwise, skip to step 236.

In step 220, N2 is assigned one such node that has not yet been paired with N1. At step 222 a decision is made to determine if the label of node N1 with the operation N2 produces any remaining GROUPING SETS in GS and only remaining GROUPING SETS in GS. If so, continue to step 224. Otherwise, return to step 218.

At step 224, construct a set N2__DESC as follows:

224.A Add to N2__DESC all nodes in the graph with N2 as input.

224.B Add to N2__DESC all nodes in the graph in which some node Ni in

N2__DESC is input.

224.C If there were additional nodes added by step 224.B, return to step

224.B, otherwise continue to step 226.

At step 226, test if N1 is in N2__DESC. If so, return to step 218. Otherwise, continue to step 228. At step 228 a decision is made to determine if the label of node N1 with the operation of each node Ni in N2__DESC produces any remaining GROUPING SETS in GS and only remaining GROUPING SETS in GS. If so, continue to step 230. Otherwise, return to step 218.

At step 230, an arc is added from N1 to N2. In step 232, for each node Ni added new GROUPING SETS generated by the intersection of N1 with Ni are added to Ni's label. These GROUPING SETS are subsequently removed from GS in step 234. The process then returns to step 218.

At step 236, if there are more nodes in the graph that have not been processed by step 216 the process returns to step 216. Otherwise, execution passes to step 238.

At step 238 a determination is made if GS is empty. If so, the process is complete, and program execution stopped at step 240. Otherwise, program execution returns to step 204 for additional grouping sets.

This process will produce a query graph model with a reduced number of GROUP BYs if there are any beneficial intersections, but it may not produce an optimal query. By generating all such choices at step 216 and step 218, and picking the result of all such graph constructions with the minimum number of nodes, an optional reduction in the set of nodes may be obtained.

Consider now a GROUP BY expression in which two or more ROLLUPs are concatenated, as in:

GROUP BY ROLLUP (a,b), ROLLUP (a,c)

This expression will produce a table which rolls up tuples for some (unspecified) aggregate expression according to grouping sets that may be derived by cross product multiplication of the grouping sets of the ROLLUPs. In this regard, recognizing that ( ) signifies the grand total set in which ALL appears in every column of the corresponding tuple, the derivation of the grouping sets for this expression, using the procedure illustrated in FIG. 8, is illustrated in the following table:

TABLE 1

= GROUPING SETS(ab, a, ()) x GROUPING SETS(ac,a, ())
= GROUPING SETS(abc, ab, ab, ac, a, a, ac, a, ())
Step 1: GS = { abc, ab, ab, ac, a, a, ac, a, () }
   Graph = T
Step 2, 1: GS = { ab, ab, ac, a, a, ac, a, () }
   abc label {abc}
       |
       T
Step 2, 2: GS = { ac, a, a, ac, a, () }
   ab label { ab(2) }
       |
   abc label { abc }
       |
       T
Step 2, 3: GS = { a, a, a, () }
   ab label {ab(2)}    ac label {ac(2)}
       |                   |
       abc label { abc }
           |
           T
Step 2, 4: GS = { () }
   ac label {ac(2), a(3)}
       |
           ab label {ab(2)}
           |
   abc label {abc}
       |
       T
Step 2, 5: GS = { }
   ac    label    {ac(2), a(3)}            ()
    |      |           +---------------+
    |      |                           |
    |      ab label  {ab(2)}
    |      |
   abc label {abc}
       |
       T In Table 1, the number associated with an element list indicates that the results of this list are replicated in the final result. For example, node "ac label {ac,a(2)}" produces only one tuple for each distinct value of element list "a" when it is grouping on "a", but in the final result, all tuples produced for grouping on "a" are duplicated since the replication number is 2. In contrast, this same node produces only one tuple for each distinct value of element list "ac", and no duplication is performed for the final result since the replication factor is 1.

The significance of this example is that both concatenated ROLLUP and CUBE operations may be represented in query graph models as stacked GROUP BYs when the procedure illustrated in FIG. 8 is implemented.

Optimized Sets of Groupings Derived from Concatenated ROLLUPs

An additional application of the present invention is found in a process for deriving an optimized set of groupings from concatenated ROLLUPs. The methodology taught by this embodiment of the present invention avoids the computationally expensive expansion step of the previous embodiment.

For a concatenation of ROLLUPs, an optimized stackup of GROUP BYs to maximize the intersections therebetween can be derived from the ROLLUP elements. Given: ROLLUP(e1__1, e1__2, e1__n1), ROLLUP(e2__1, e2__2, ... e2__n2), . . . ROLLUP(em__1, em__2, . . . em__nm)

The process forms the following stack of GROUP BYs for ROLLUP i:

```
    GROUP BY(e1_1, e1_2, ..., e1_n1,
        ...
        e<i-1>_1, e<i-1>_2, ..., e<i-1>_n<i-1>,
  >>>   ei_1, ei_2, ... ei_(ni-1),
        e<i+1>_1, e<i+1>_2, ..., e<i+1>_n<i+1>,
        ...
        em_1, em_2, ..., em_nm)
    GROUP BY(e1_1, e1_2, ..., e1_n1,
        ...
        e<i-1>_1, e<i-1>_2, ..., e<i-1>_n<i-1>,
  >>>   ei_1, ei_2, ..., ei_(ni-2),
        e<i+1>_1, e<i+1>_2, ..., e<i+1>_n<i+1>,
        ...
        em_1, em_2, ..., em_nm)
        ...
    GROUP BY(e1_1, e1_2, ..., e1_n1,
        ...
        e<i-1>_1, e<i-1>_2, ..., e<i-1>_n<i-1>,
  >>>   ei_1,
        e<i+1>_1, e<i+1>_2, ..., e<i+1>_n<i+1>,
        ...
        em_1, em_2, ..., em_nm)
    GROUP BY(e1_1, e1_2, ..., e1_n1,
        ...
        e<i-1>_1, e<i-1>_2, ..., e<i-1>_n<i-1>,
  >>>
        e<i+1>_1, e<i+1>_2, ..., e<i+1>_n<i+1>,
        ...
        em_1, em_2, ..., em_nm)
``` where >>> signifies how the elements of one GROUP BY differ from the others.

In summary, this stack of GROUP BYs for $ROLLUP_i$ is constructed by, for each prefix of the list of elements for $ROLLUP_i$, taking a GROUP BY of the prefix and all elements of all the other ROLLUPs, excluding $ROLLUP_i$.

This methodology is implemented in a two-step process including:

1. Base Step:
   A base GROUP BY is produced with all the elements from each of the ROLLUPs. This base GROUP BY is the input to the GROUP BY for $ROLLUP_1$ with the greatest cardinality, where the cardinality of a GROUP BY is the number of elements for which it is specified. The result of this GROUP BY is, in turn, the input to the GROUP BY for ROLLUP 1 with the greatest cardinality −1, and so forth. This results in all GROUP BYs for ROLLUP 1 being stacked from greatest to least cardinality such that each input GROUP BY is a superset of the elements of the operation. The base group by and all the GROUP BYs for ROLLUP 1 are unioned together in UNION1. and, 2. Iterative step:
   For each ROLLUP i, i>1:
   UNION<i−1> is input to the GROUP BY for ROLLUP i that has the greatest cardinality. The result of this GROUP BY is, in turn, the input to the GROUP BY for ROLLUP i with greatest cardinality −1, etc. etc. This results in all GROUP BYs for ROLLUP i being stacked from greatest to least cardinality, such that each input GROUP BY is a superset of the elements of the operation. UNION<i−1> and all GROUP BYs for ROLLUP i are unioned together to form UNIONi.

As an example, consider the following: GROUP BY ROLLUP(a,b), ROLLUP(x,y) in which the GROUP BY's for ROLLUP(a,b) are:
   GROUP BY(a,x,y)
   GROUP BY(x,y)
and the GROUP BY's for ROLLUP(x,y) are:
   GROUP BY(a,b,x)
   GROUP BY(a,b)

Now, the base group for ROLLUP(a,b)ROLLUP(x,y) is determined by base step:

```
           UNION1
           | | |
           | | | GROUP BY(x,y)
           | | |
           | | GROUP BY(a,x,y)
           | |
           GROUP BY(a,b,x,y)
               |
               T
```

Then, in iterative step(1) the GROUP BYs, for ROLLUP(a,b)ROLLUP(x,y) are determined by and stacked above UNION1, thereby taking advantage of the intersection property, as seen for example in the label for GROUP BY (abx), whose results also include GROUP BYs of ax and x.

```
UNION2           Label {abxy, axy, xy, abx, ax, x, ab, a, ()}
| | |
| | GROUP BY(ab)  Label {ab, a, () }
| | |
| GROUP BY(abx)   Label {abx, ax, x}
| |
UNION1           Label {abxy, axy, xy}
| | |
| | GROUP BY(xy)
| | |
| GROUP BY(axy)
| |
GROUP BY(abxy)
    |
    T
```

Consider a second example of concatenated ROLLUPs, in which GROUP BY ROLLUP(a,b,c), ROLLUP(x,y), ROLLUP (v,w) is input. In this case, the GROUTP BY's for ROLLUP(a,b,c) are:
   GROUP BY(a,b,x,y,v,w,)
   GROUP BY(a,x,y,v,w)
   GROUP BY(x,y,v,w)
the GROUP BY's for ROLLUP(x,y) are:
   GROUP BY(a,b,c,x,v,w)
   GROUP BY(a,b,c,v,w)
and, the GROUP BY's for ROLLUP(v,w) are:
   GROUP BY(a,b,c,x,y,v)
   GROUP BY(a,b,c,x,y)
Now, in the base step the base group is determined by:

```
UNION1
| | | |
| | | GROUP BY(x,y,v,w)
| | | |
| | GROUP BY(a,x,y,v,w)
| | |
| GROUP BY(a,b,x,y,v,w)
| |
GROUP BY(a,b,c,x,y,v,w)
    |
    T
Iterative step(1):

UNION2
| | |
| | GROUP BY(a,b,c,v,w)    label {abcvw, abvw, avw}
| | |
```

```
| GROUP BY(a,b,c,x,v,w)     label {abcxvw, abxvw, axvw}
| |
UNION1                     label { abcxyvw, abxyvw, axyvw }
| | | |
| | | GROUP BY(x,y,v,w)
| | |  |
| | GROUP BY(a,x,y,v,w)
| | |
| GROUP BY(a,b,x,y,v,w)
| |
GROUP BY(a,b,c,x,y,v,w)
|
T
```
Iterative step(2):

```
UNION3     label {abcxyvw, abxyvw, axyvw, xyvw,
| | |            abcxvw, abxvw, axvw, xvw,
| | |            abcvw, abvw, avw, vw,
| | |            abcxyv, abxyv, axyv, xyv, abcxv,
| | |            abxv, axv, xv, abcv, abv, av, v,
| | |            abcxy, abxy, axy, xy, abcx, abx, ax, x
| | |            abc, ab, a, ()}
| | |
| | GROUP BY(a,b,c,x,y)     label{abcxy, abxy, axy, xy,
| |  |                            abcx, abx, ax, x,
| |  |                            abc, ab, a, ()}
| | |
| GROUP BY(a,b,c,x,y,v)     label{abcxyv, abxyv, axyv, xyv,
|  |                              abcxv, abxv, axv, xv,
|  |                              abcv, abv, av, v}
|  |
UNION2     label(abcxyvw, abxyvw, axyvw, xyvw,
| | |           abcxvw, abxvw, axvw, xvw,
| | |           abcvw, abvw, avw, vw}
| | |
| | GROUP BY(a,b,c,v,w)     label {abcvw, abvw, avw, vw}
| |  |
| GROUP BY(a,b,c,x,v,w)     label {abcxvw, abxvw, axvw, xvw}
|  |
UNION1                     label { abcxyvw, abxyvw, axyvw, xyvw}
| | | |
| | | GROUP BY(x,y,v,w)
| | |  |
| | GROUP BY(a,x,y,v,w)
| | |
| GROUP BY(a,b,x,y,v,w)
| |
GROUP BY(a,b,c,x,y,v,w)
|
T
```

An Application for Computing the Cube Function as a Concatenation of ROLLUPs

CUBE is equivalent to a concatenation of ROLLUPs. Hence, the previously-discussed ROLLUP stacking algorithm applies.

As an example, consider the expression:

GROUP BY CUBE (a,b,x,y) here,

CUBE(a,b,x,y)=ROLLUP(a), ROLLUP(b), ROLLUP(x), ROLLUP(y) and the previous algorithm for optimal stacking of ROLLUPs is performed as follows:

```
UNION label { abxy, abx, aby, axy, bxy, ab, ax, ay, bx, by, xy, a, b,
              x, y, ()}
| |
| |
| GROUP BY (abx) label { abx, ab, ax, bx, a, b, x, ()}
| |
UNION label { abxy, aby, axy, bxy, ay, by, xy, y }
| |
| GROUP BY (aby) label { aby, ay, by, y}
| |
UNION label { abxy, axy, bxy, xy }
| |
| GROUP BY (axy) label { axy, xy }
| |
UNION label { abxy, bxy }
| |
GROUP BY (bxy)
        |
        GROUP BY (abxy)
        |
        T
```

We claim:

1. In a relational database management system utilizing a data processor for storing data in the form of at least one table comprised of tuples having one or more columns, wherein the data contained in the relational database management is retrievable by means of query language aggregation queries, a data processor implemented method for increasing the computational efficiency of the calculation of an aggregation query by reducing the number of GROUP BY operations required to specify the aggregation query, the method comprising:

receiving an aggregation query that includes two or more element lists;

forming the intersection of a first element list of the aggregation query and a second element list of the aggregation query by inputting a first GROUP BY of the first element list to a second GROUP BY of the second element list; and wherein forming includes stacking a first GROUP BY operation with respect to a second GROUP BY operation to represent results of the GROUP BY of the first element list, the second GROUP BY of the second element list, and at least a third GROUP BY of a third element list produced by the stacking of the first and second GROUP BY operations.

2. The method of claim 1, wherein stacking represents a GROUP BY clause with multiple GROUPING SETS in the aggregation query.

3. The method of claim 1, wherein stacking represents a GROUP BY clause with at least one ROLLUP in the aggregation query.

4. The method of claim 1, wherein stacking represents a GROUP BY clause with at least two concatenated ROLLUPs in the aggregation query.

5. The method of claim 1, wherein stacking represents a GROUP BY clause with a CUBE in the aggregation query.

6. In a relational database management system utilizing a data processor for storing data in the form of at least one table comprised of tuples having one or more columns, wherein the data contained in the relational database management is retrievable by means of query language aggregation queries, a data processor implemented method for increasing the computational efficiency of the calculation of an aggregation query by reducing the number of GROUP BY operations required to specify the aggregation query, the method comprising:

receiving an aggregation query that includes two or more element lists, wherein the aggregation query includes a non-holistic aggregation operation; and forming the intersection of a first element list of the aggregation query and a second element list of the aggregation query by inputting a first GROUP BY of the first element list to a second GROUP BY of the second element list.

7. In a relational database management system utilizing a data processor for storing data in the form of at least one table comprised of tuples having one or more columns, wherein the data contained in the relational database management is retrievable by means of SQL aggregation queries, a data processor implemented method for producing a model of an SQL query having a GROUP BY clause limited by a set of grouping-sets, in which nodes of the model represent query operations and nodes are identified by labels, each label representing a GROUP BY operation that results from the application of a GROUP BY operation to all inputs of a represented node, the method comprising:

placing a base table T in the model;

defining a variable that represents the GROUP BY of a maximal grouping set in the set of grouping sets;

finding a first node in the model representing an operation that is a superset of the GROUP BY operation represented by the variable;

adding the variable to the model with the first node as its input;

removing the maximal set from the set of grouping sets; and for each node in the model other than the first node:

determining if the label of the first node with the operation of a second node produces any remaining GROUP BYs in the set of grouping sets and only remaining GROUP BYs in the set of grouping sets;

responsive to determining that the label of the first node with the operation of the second node produces remaining GROUP BYs in the set of grouping sets and only remaining GROUP BYs in the set of grouping sets, adding a data flow arc from the first node to the second node, the data flow arc defining an intersection;

adding new GROUP BYs produced by the intersection to the label of the second node; and removing new GROUP BYs produced by the intersection from the set of grouping sets.

8. The method of claim 7, further including iteratively performing all steps following placement of the base table, until the set of grouping sets is empty.

9. The method of claim 7, wherein the model comprises a graph.

10. In a relational database management system utilizing a data processor for storing data in the form of at least one table comprised of tuples and having one or more columns, wherein the data contained in the relational database management system is retrievable by means of SQL aggregation queries, a data processor implemented method for increasing the computational efficiency of the calculation of an aggregation query including a concatenation of ROLLUP operations by reducing the number of GROUP BY operations required to specify the concatenated ROLLUP operations, the method comprising:

receiving an aggregation query including a plurality p of concatenated ROLLUP operations, where the ith ROLLUP operation is specified by a list of elements $n_i$;

representing the p concatenated ROLLUP operations with a stack of GROUP BY operations in which the number of GROUP BY operations is less than $((n1+1) \times (n2+1) \times \ldots (np+1))$; and executing the concatenated ROLLUP operations according to the stack of GROUP BY operations.

11. The method of claim 10, wherein representing includes:

constructing a base GROUP BY operation including all elements from each of the ROLLUP operations;

constructing a stack of GROUP BY operations for one ROLLUP operation of the p ROLLUP operations by, for each prefix in a list of elements for the one ROLLUP operation, taking a GROUP BY operation of the prefix and all elements of the remaining ROLLUP operations, excluding the one ROLLUP operation;

creating a base group by inputting the base GROUP BY operation into the stack of GROUP BY operations for the one ROLLUP operation;

creating a second group by constructing a stack of GROUP BY operations for a second ROLLUP operation by, for each prefix in a list of elements for the second ROLLUP operation, taking a GROUP BY operation of the prefix and all elements of the remaining ROLLUP operations, excluding the second ROLLUP operation;

inputting the results of the base group into the second group; and unioning the results of the base group with the results of the second group.

12. The method of claim 11, wherein the cardinality of the one ROLLUP operation is the highest cardinality of all the ROLLUP operations.

13. The method of claim 12, wherein the cardinality of the second ROLLUP operation is the next highest cardinality of all ROLLUP operations.

14. The method of claim 13, wherein the aggregation query includes a CUBE operation, the concatenation of ROLLUP operations representing the CUBE operation, the method further including:

creating a third group by constructing a stack of GROUP BY operations for a third ROLLUP operation by, for each prefix in a list of elements for the third ROLLUP operation, taking a GROUP BY operation of the prefix and all elements of the remaining ROLLUP operations, excluding the third ROLLUP operation;

inputting the results of the base group and the second group into the third group; and unioning the results of the base group, the second group, and the third group.

\* \* \* \* \*